United States Patent [19]

Cruz, Jr. et al.

[11] 3,862,069
[45] Jan. 21, 1975

[54] MICROCRYSTALLINE POLYOLEFINS AND DISPERSIONS THEREOF

[75] Inventors: Mamerto M. Cruz, Jr., Pennington, N.J.; Nicholas Z. Erdi, New York, N.Y.; Orlando A. Battista, Yardley, Pa.

[73] Assignee: FMC Corporation, Philadelphia, Pa.

[22] Filed: Sept. 17, 1973

[21] Appl. No.: 397,733

Related U.S. Application Data

[63] Continuation of Ser. No. 231,399, March 2, 1972, abandoned, which is a continuation of Ser. No. 49,174, June 23, 1970, abandoned, which is a continuation-in-part of Ser. No. 714,754, March 21, 1968, abandoned.

[52] U.S. Cl..................... 260/28.5 A, 260/94.9 GC
[51] Int. Cl........................... C08f 45/52, C08f 3/10
[58] Field of Search................. 260/28.5 A, 29.6 XA, 94.9 GC

[56] References Cited
UNITED STATES PATENTS 3,705,123  12/1972  Mahlman et al............... 260/28.5 A Primary Examiner—Morris Liebman
Assistant Examiner—S. L. Fox

[57] ABSTRACT

Chemically degraded, substantially atactic-free stereoregular polyolefin resin exhibiting a sharp X-ray diffraction and distinctly modified thermal behavior compared to its precursor resin is disclosed herein. This material is readily mechanically attrited to obtain a product capable of forming a stable colloidal dispersion in a liquid medium having a minimal swelling action thereon. The chemically degraded polyolefin is prepared by a thermal catalytic oxidation treatment whereby the long chain polymers are considerably reduced in length by cleavage of the amorphous segments therein and the amorphous and atactic portions are removed by solvation.

6 Claims, No Drawings

MICROCRYSTALLINE POLYOLEFINS AND DISPERSIONS THEREOF

This application is a continuation of application Ser. No. 231,399, filed Mar. 2, 1972, now abandoned, which is a continuation of application Ser. No. 49,174, filed June 23, 1970, now abandoned, which is a continuation-in-part of our copending application Ser. No. 714,754, filed March 21, 1968, now abandoned.

DESCRIPTION OF THE PRIOR ART

It is known that synthetic linear polyolefins possess a crystalline-amorphous network or morphological structure consisting of regions of high order commonly referred to as crystalline and regions of low order commonly referred to as amorphous. In this network structure, primary chains extend through a series of microcrystals connecting them by amorphous regions or hinges involving primary molecular bonds. Because of the strength of the primary molecular bonds, it is impractical to free the microcrystals by mechanical means such as attrition or grinding. Dissolving of the polyolefin and reprecipitation results merely in a rearrangement of the crystalline-amorphous network structure leading once again to a continuous network of crystalline and amorphous areas connected by primary molecular bonds.

It is also known that synthetic linear polyolefins having molecular weights sufficiently high to allow conversion into fibers possess toughness and elastic characteristics which make grinding of the polyolefins into finely divided particles very difficult. Precipitation of such polyolefins from a solution tends to produce stringy cohesive masses. Lower molecular weight polyolefins may have the necessary physical characteristics to permit the resin to be ground in a finely divided state and to be reduced to a finely divided state. Regardless of the molecular weight of these forms of finely divided polyolefins and whether produced by a grinding operation or by a dissolving and precipitation technique, the particles are characterized by the typical polyolefin crystalline-amorphous network structure. These finely divided particles do not form stable colloidal dispersions and gels in liquid swelling media as defined herein. Although such particles may be dispersed in liquid swelling media by agitation, they readily settle out after agitation is discontinued.

U.S. Pat. No. 3,073,790 to Bosoni, issued Jan. 15, 1963 discloses finely divided, high molecular weight, isotactic, crystalline polypropylene resin obtained directly from the polymerization process. This material is ground under high pressure and requires an emulsifying agent or protective colloid to provide a stable dispersion in water.

GENERAL DESCRIPTION OF INVENTION

In accordance with the present invention, high molecular weight, at least partially crystalline stereoregular polyolefin resin is subjected to a controlled chemical degradation by subjecting the resin to thermal catalytic oxidation whereby the amorphous portions of the polymer chain are cleaved, solubilized and removed, and the more crystalline, difficultly oxidizable portions remain. Treatment of the amorphous and atactic portions of the resin with a solvent provides a substantially atactic-free, chemically degraded polyolefin resin having distinctly modified thermal behavior. This material may then be subjected to mechanical attrition preferably in the presence of a liquid having a minimal swelling action on the crystalline polyolefin which in some instances may solvate some of the surface thereof but which will not destroy its particulate or discrete form. Mechanical attrition is continued until a stable colloidal dispersion results. In many instances, when at least about 5 percent by weight of the polyolefin is reduced to a particle size not exceeding one micron, the stable dispersion will be attained. Preferably, however, attrition is continued until at least about 95 percent by weight of the polyolefin does not exceed a particle size of one micron and at least about 10 percent by weight have a particle size not exceeding 0.1 micron. Some of the disintegrated polyolefin will have a size under 0.01 micron.

The term "crystalline" as used herein is meant to include those portions of the stereoregular polyolefin which are difficultly oxidizable under the conditions of this invention. The finely-divided chemically degraded polyolefin resin or "microcrystalline" polyolefin disclosed herein is very highly crystalline as measured by X-ray diffraction patterns contrasted to the relatively diffuse patterns exhibited by the precursor polyolefin resin having a crystalline-amorphous structure. In addition, the molecular weight of the oxidized polyolefin resin is considerably reduced, e.g., as much as ten fold compared to the precursor resin. Still further, the oxidized polyolefin resin demonstrates in a standard differential scanning calorimetry procedure a totally different thermal behavior.

The crystalline polyolefins used in practicing the invention are well known polymeric materials the description and preparation of which is set forth in U.S. Pat. Nos. 3,112,300 and 3,112,301 as well as in various journals and texts pertaining to polymer science. These hydrocarbon polymers are characterized by a high degree of symmetry in their chemical configuration. Such stereoregular polymers, as they are commonly referred to, are realized by conducting the polymerization of olefinic monomers in the presence of a directing catalyst which steers the polymerization toward a geometric arrangement of the side groups. It is this regularity of structure which accounts for the high degree of crystallinity of the polymers. Exemplary stereoregular polyolefins which can be converted to the microcrystalline state by the process of the invention include polyethylene, polypropylene, poly(butene-1), poly(3-methylbutene-1), poly(4-methylpentene-1), poly(pentene-1), poly(3,3-dimethylbutene-1), poly(4,4-dimethylpentene-1), poly(hexene-1), poly(octene-1), poly(decene-1) and the like.

The realization of these new "microcrystalline" polyolefins is based on the recovery of the difficulty oxidized, highly crystalline, heptane insoluble residue from the polypropylene resin precursor. This is accomplished by a selective accelerated oxidative chain scission mechanism to cleave, solubilize and remove the amorphous polymer fragments. The residue is readily transformed by mechanical attrition into material capable of forming stable colloidal dispersions and gels in liquids.

The preferential oxidation is achieved by subjecting the linear polyolefin to elemental oxygen, either in the form of air or the pure gas, in the presence of a metal salt as a catalyst at moderately elevated temperatures. Oxidation by air or oxygen alone does not produce the selective attack on the amorphous centers as does the catalytic oxidation; at least it does not give rise to microcrystalline polyolefin.

The oxidation can be carried out in any manner which provides contact of the metal salt catalyst and oxygen with the amorphous regions of the polyolefin. An especially effective and convenient procedure consists of heating in the presence of oxygen a suspension of the polypropylene, commonly powder or fibers in a liquid containing the metal salt catalyst. The metal salt is preferably dissolved in the liquid. Apparently the swelling action is greater at the amorphous regions thereby facilitating their contact with the catalyst and oxygen. Where desired, the polyolefin can be treated with the catalyst separately and then oxidized in the dry state. Practicable temperature ranges are from about room temperature up to about 180°C., the preferred range being about 100°C.

The duration of the oxidative treatment will vary according to the temperature and the specific liquid media as well as the particular polymer employed. Generally speaking, however, from about one half to about ten hours will produce satisfactory yields and results. For shorter periods, stronger swelling media and higher temperatures should be used; for longer periods, milder swelling media and lower temperatures will suffice.

Although the polyolefin can be used directly as purchased or prepared, we prefer to subject it to a preannealing treatment in order to increase the degree of crystallinity. A typical procedure is to heat the polymer for a few hours at from about 100° to about 150°C. under a nitrogen atmosphere followed by washing in acetone and drying. In the case of commercial polyolefins which may be in fiber, film or pellet forms, it is desirable to remove UV stabilizers and anti-oxidants. These additives are extracted from the polymer with organic solvents such as liquid chlorinated hydrocarbons.

The liquid medium in which oxidation is carried out can be any of the relatively inert liquids and in this connection we have ascertained that the normally liquid, relatively inert organic liquids usually referred to as solvents are especially suitable and convenient. As above noted, the reaction media should be capable of exerting a mild swelling action on the amorphous portions of the polymer thereby facilitating penetration of the catalyst to these regions of low lateral order. A class of liquid media particularly appropriate for the aforesaid purpose are the liquid, saturated aliphatic and aromatic hydrocarbons as exemplified by pentane, hexane, heptane, octane, isooctane, benzene, toluene, xylene, mesitylene and their chlorinated derivatives and mixtures of these solvents.

The metal salt catalyst is preferably a transition metal salt of an organic acid having an apppreciable solubility in the liquid medium so as to facilitate its penetration into the partially swelled polyolefin. Catalysts which we have found especially effective are the heavy metal salts of higher carboxylic acids such as copper oleate, copper palmitate, copper stearate, nickel oleate, nickel undecylate, manganese stearate, chromium stearate, cobalt stearate, cobalt palmitate, cobalt oleate, cobalt myristate, nickel napthenate, copper napthenate, mixtures thereof and the like.

Although its principal function is to effect mild swelling of the polyolefin thereby promoting the catalytic oxidation of the amorphous centers, the liquid reaction medium serves a further purpose. It is effective in dissolving out atactic polymer which is invariably formed, at least in some small degree, during the stereopolymerization of the olefin monomer. Thus, by carrying out the oxidation of the polyolefin in the manner herein not only are the amorphous centers removed by oxidation but the swelling medium effects leaching out of the atactic polymer leaving behind essentially pure microcrystalline polymer.

The isolated microcrystalline polyolefin in aggregated form is converted into free microcrystals by the mechanical shearing action of the type provided by attrition mils, planetary mixers, sonic mixers, grinding mills and the like. The mechanical breakdown of the partially degraded polymer is effectively accomplished in a liquid which exerts a controlled swelling effect on the microcrystals and for purposes of this invention can be termed "Controlled Liquid Swelling Media" and are liquid media which have a minimum swelling action twoard the microcrystals and in some instances may solvate or tend to solvate the surface of the individual microcrystals but do not attack and destroy the lateral order or crystallinity in the interior of the microcrystals.

"Controlled Liquid Swelling Media" as understood herein, include hydrocarbons both aliphatic and aromatic as well as their chlorinated derivatives, such as heptane, hexane, toluene, xylene, chloroform, carbon tetrachloride, ethylene dichloride, etc., lower aliphatic alcohols and polyhydric alcohols such as methanol, ethanol, isopropanol, glycol, glycerol, etc., lower aliphatic ketones such as acetone, methyl ketone, diethyl ketone, etc, and other similar types of organic liquids. Although these swelling agents can be used alone they can often be advantageously used in admixture with one another to attain the requisite degree of swelling action of the microcrystals. The above described liquid swelling media are those known to be useful as non-solvents for stereoregular polyolefins as described by Natta et al in U.S. Pat. No. 3,112,300. There has been found to be no appreciable difference in the solvating action of organic liquids on the microcrystalline polyolefin than exhibited with the high molecular weight stereoregular precursor resins.

The disintegration is carried out to such an extent that the resulting particulate material is characterized by forming a stable suspension in the liquid medium in which they are attrited or in which they are subsequently dispersed. The amount of disintegration is generally carried out whereby at least 5 percent by weight has a particle size not exceeding one micron and preferably until at least 95 percent by weight, has a particle size not greater than one micron and at least about 10 percent by weight has a particle size no greater than about 0.1 micron. By a stable suspension is understood one in which the attrited material will not settle out but remain suspended indefinitely even for periods measured in terms of weeks or months. At lower concentrations of the attrited material, the suspension is a dispersion, while at higher concentrations, it is a gel.

Following the mechanical disintegration of the oxidized material, the resulting product whether a dispersion or gel may be used as such; or it may be dried; or it may be desirable to separate it into fractions having a more uniform particle size distribution. The dried attrited material is readily redispersed in liquid media, e.g., aqueous liquids and organic liquids with the help of a blender-type agitator.

For obtaining dried products, a number of drying procedures are available and while redispersible materials result from each procedure, some are more advantageous and desirable than others. Examples of drying include freeze-drying, spray drying, drum drying, drying by solvent displacement and oven drying.

Fractionation of the attrited products may be affected by such separation techniques as mechanical sifting, settling in a liquid or centrifuging. Cyclone type separators are very useful for the dried product.

Shaped articles may be formed from the stable dispersion of this invention by forming, for example, by extruding or casting the dispersion in the desired shape and washing or immersing the article in water or a dilute alkaline solution including, for example, sodium hydroxide. Or, the microcrystalline polyolefin gel or dried attrited material may be blended with an appropriate plasticizing agent and the blend extruded, molded, or cast into various shapes and dried. The dispersion and gels are also useful in the production of films, as coatings for various base materials as exemplified by paper, wood, and the like and as binding agents in nonwoven fabrics. The microcrystalline polyolefins of this invention are also useful for admixture with other microcrystalline products such as microcrystalline cellulose, microcrystalline starch, microcrystalline nylon in the production of molding powders and structural objects.

The following examples are set forth to illustrate the production of finely divided microcrystalline polyolefins and uses thereof. Examples:

THE CATALYZED DRY OXIDATION OF POLYPROPYLENE IN FIBER FORM

EXAMPLE 1

50.0 g. of ¼ inch cut, 10 denier polypropylene fibers were washed with methylene chloride at room temperature, after which they were centrifuged and air-dried at 50°C. in vacuo. This treatment was repeated using fresh portions of methylene chloride until essentially all soluble substances had been extracted out of the polymer.

15.0 g. of the extracted fibers were heated for two hours at 90°–94°C. in a solution of 500 mls. of n-heptane containing 0.5 g. of copper stearate, after which the fibers were centrifuged and dried at ambient room temperature. A 5.0 g. sample, on being heated in an air circulating oven at 130°C. for 3½ hours, resulted in a yellow colored material interspersed heterogeneously with yellow-brown spots. The product was slurried in heptane using a Waring Blender, filtered and air dried. There was obtained 91.7 percent of microcrystalline polypropylene. This product when suspended in n-heptane and subjected to attrition between glass slides formed microcrystalline particles having a size less than one micron.

EXAMPLE 2

The procedure of Example 1 was repeated except that the heating was carried out for 10 hours, at 105°C. The result, including the yield of microcrystalline polypropylene paralleled that of the first example.

EXAMPLE 3

The procedure of Example 2 was repeated except that a stream of oxygen was introduced into the reaction system. The yield of the microcrystalline polypropylene including its properties were essentially identical to that of the previous example.

In general, all of the modified polypropylene products obtained by the aforesaid examples exhibited infra-red absorption at 1,730 cm$^{-1}$, indicating the presence of carbonyl groups, sharp melting point endotherms of about 10°–15° lower than the untreated material while increased crystallinity was shown by x-ray diffraction patterns. These materials formed microcrystalline colloidal particles.

THE CATALYZED DRY OXIDATION OF POLYPROPYLENE IN POWDER FORM

EXAMPLE 4

200.0 g. of 60–100 mesh polypropylene powder were added to a solution of 1.0 g. copper stearate in 500 g. of n-heptane, and the resulting mixture refluxed for 30 minutes, after which the bluish solid was filtered off and dried at 50°C. in vacuo. A 20.0 g. sample, on heating at 130°C. for 4 hours gave a yellowish-brown product which was slurried in heptane using a Waring Blender, filtered, and dried in vacuo. The yield of product was 84 percent, and was composed of particles of less than 1 micron as demonstrated by glass slide attrition.

EXAMPLE 5

The procedure of Example 4 was repeated except that the sample was heated at 105°C. for 10 hours. There was obtained a heterogeneous yellowish-brown product, which on purification produced a yield of 92 percent of microcrystalline polypropylene as demonstrated by glass slide attrition.

EXAMPLE 6

100.0 g. of 60–100 mesh polypropylene powder was dispersed in a mixture of 700 g. of 75 parts of methylene chloride and 25 parts of n-heptane containing 3.5 g. copper stearate, and the resulting mixture heated at 94°C. for 1½ hours while a continuous stream of dry air was injected into the reaction mixture. A portion of the powder was transformed into a homogeneous molten gelatinous mass, from which the dispersed particulate fraction was isolated, washed with heptane, filtered, and vacuum dried at 50°C. to produce 43 percent of dry product. This was then heated for three hours at 105°C. to form a heterogeneous yellowish-brown solid which was slurried in heptane using a Waring Blender, filtered and vacuum dried at 50°C. The resulting product broke down into less than one micron particles when wetted with heptane between two glass slides. The purified gelatinous mass was devoid of particles and showed no particle breakdown with mechanical attrition.

When a sample of the extracted polypropylene powder was merely heated, in the presence of air, the resulting oxidized polymer contained a negligible amount of microcrystalline particles as demonstrated by no particle breakdown by glass slide attrition.

LIQUID MEDIA CATALYTIC OXIDATION AT ELEVATED TEMPERATURE AND PRESSURE OF POLYPROPYLENE FIBERS

EXAMPLE 7

15.0 g. of methylene chloride extracted ¼ inch cut, 10 denier polypropylene fibers were added to a solution of 0.5 g. of copper stearate in 100 g. of n-heptanes and the resulting mixture heated at 130°C. for 4 hours under an atmosphere of oxygen at 50 psi. The resulting creamy-yellowish-white solid was washed with heptane, centrifuged and air dried. There was obtained a yield of 84 percent of microcrystalline polypropylene. This product, when subjected to attrition between glass slides, formed microcrystalline particles having a size less than one micron.

EXAMPLE 3

Using the procedure of Example 7, 10.0 g, of methylene chloride extracted ¼ inch cut, 10 denier polypropylene fibers were added to a solution of 0.33 g. of copper stearate in 150 g. of n-heptane, and the mixture heated under 50 psi of dry air for 2 hours at 100°C., then 2 hours at 120°C. After purification as above described, the product yield amounted to 92 percent. This products, when product, to attrition between glass slides, formed microcrystalline particles having a size less than one micron.

A 5.0 g. sample of the purified product was dried for 1 hour at 125°C. under nitrogen atmosphere and then added to a mixture of 90 parts n-heptane and 10 parts xylene. There was obtained an 8 percent gel dispersion which microscopic examination showed to be composed of particles less than 0.5 micron.

EXAMPLE 9

15.0 g. of methylene chloride extracted polypropylene fibers were added to a mixture consisting of 100 g. of 90 parts of water, 10 parts of n-heptane, 0.5 g. of copper stearate and 0.1 g. of Duponal MR (the trademark for fatty alcohol sulfates used as dispersing agents). The resulting mixture was heated for 4 hours at 130°C. under an atmosphere of 50 psi oxygen. After treatment and purifying in the previously described manner, the residue was slurried in heptane. Microscopic examination of the heptane slurry showed that approximately 14 percent was composed of particles of the order of 0.5 micron. The other fraction exhibited only a slight indication of sulmicron particles.

LIQUID MEDIA CATALYTIC OXIDATION AT ELEVATED TEMPERATURE AND PRESSURE OF POLYPROPYLENE FIBERS AND POLYMERS

EXAMPLE 10

15.0 g. of methylene extracted ¼ inch cut, 10 deneir polypropylene fibers were immersed in 140.0 g. of n-heptane containing 0.25 g. of cobalt stearate and the mixture placed under 50 psi dry air. A second preparation was carried out using 0.50 g. of copper stearate. The heating conditions were as follows:

| Time, hrs. | Cobalt Stearate Pressure, psi | Temperature °C. | Copper Stearate Pressure, psi | Temperature °C. |
|---|---|---|---|---|
| 0 | 50 | 30 | 50 | 30 |
| 1 | 60 | 100 | 60 | 75 |
| 2 | 72 | 110 | 70 | 110 |
| 3 | 72 | 110 | 70 | 110 |
| 4 | 72 | 110 | 70 | 110 |
| 5 | 73 | 110 | 70 | 110 |

After washing and drying these products in the manner previously described, yields of 59 percent and 92 percent were obtained for the cobalt and copper catalyzed reactions, respectively. Homogeneous products were obtained which broke down easily with glass slide attrition into colloidal particulate forms.

A 10 percent dispersion of the Cu stearate reacted product gave a Brookfield viscosity of 9,500 cps in 90 parts of n-heptane and 10 parts of xylene at room temperature. The temperature was allowed to rise in the Waring Blender to 60°C. The product showed no syneresis characteristics after standing at room temperature.

EXAMPLE 11

20.0 g. of polypropylene powder were added to a solution of 320 mls. of 30 parts of carbon tetrachloride, 70 parts of n-heptane (by volume) and 0.60 g. of copper stearate and the mixture heated under 80 psi of oxygen for 2 hours at 110°C. The material was washed with 250 mls. of a mixture of 1 volume isopropanol, 1 volume of concentrated hydrochloric acid (37.8 percent) and 2 volumes of water. The product was filtered, washed several times with water. filtered and dried. The yield of purified product was 90–93 percent which on mechanical attrition in 70 volumes of isopropanol, 20 volumes of water and 10 volumes of carbon tetrachloride by a Waring Blender yielded a product wherein the particles had a size of less than one micron. A 17 percent gel dispersion in the above liquid medium exhibited a Brookfield Viscosity value of 20,000 cps. at 10 rpm.

EXAMPLE 12

100.0 g. of 60–100 mesh polypropylene powder was heat annealed by heating in 800 g. of Dow Corning silicone 220 Oil at 145°–150°C. for 2 hours under a continuous stream of nitrogen gas after which it was filtered, washed several times with acetone and vacuum dried at 50°C. for 6 hours.

A 15.0 g. sample of the heat annealed polypropylene 60–100 mesh powder was immersed in 135 g. of n-heptane containing 0.5 g. of copper stearate and placed under 50 psi air pressure. A similar sample was prepared containing 0.60 g. of cobalt stearate. Both mixtures were heated at 110°C. for 4 hours. The reaction conditions were as follows:

| Time, hrs. | Cobalt Stearate Pressure, psi | Temperature °C. | Copper Stearate Pressure, psi | Temperature °C. |
|---|---|---|---|---|
| 0 | 50 | 30 | 51 | 35 |
| 1 | 62 | 85 | 65 | 75 |
| 2 | 70 | 110 | 70 | 110 |
| 3 | 70 | 112 | 70 | 110 |
| 4 | 70 | 110 | 70 | 110 |
| 5 | 70 | 110 | 70 | 111 |

Both pressure reacted samples were filtered hot and washed several times with n-heptane. Samples were treated with 350 mls. of 1.0 percent nitric acid containing 0.20 g. of Duponol ME at 60° C. in a Waring Blendor for 15 minutes at maximum agitation. The product was filtered, washed with water to pH 6.0 to remove catalyst. The product was washed with acetone, air dried for 3 hours and then vacuum dried at 50° C. for 3 hours.

molecular weight distribution of the copper salt catalyzed microcrystalline polypropylene as prepared in Example 12 and the untreated polymer precursor were determined by gel permeation chromatography (GPC). The GPC calibration curve was prepared with anionic polystyrenes of known molecular weights. The intrinsic viscosity of the polymer was determined in decalin solvent at 135°C. The results of the molecular weight studies are set forth in the following tables:

Molecular Weight of Microcrystalline Polypropylene

| Material | Intrinsic Viscosity | Weight Avg. M.W. | Number Avg. M.W. | Polydispersity Index* |
|---|---|---|---|---|
| Polypropylene Precursor (Powder) | 2.62 | 433,700 | 148,000 | 2.92 |
| Microcrystalline Polypropylene (Powder) | 0.30 | 34,770 | 21,000 | 1.66 |

*Weight Avg.M.W./Number Avg.M.W.

Molecular Weight Distribution of Microcrystalline Polypropylene

| Polypropylene Precursor (Powder) | | Microcrystalline Polypropylene (Powder) | |
|---|---|---|---|
| Molecular Wt. Range | Amount,% | Molecular Wt. Range | Amount,% |
| 0 – 50,000 | 7.00 | 0 – 5000 | 1.19 |
| 50,000 – 100,000 | 12.70 | 5000 – 10,000 | 7.91 |
| 100,000 – 150,000 | 11.10 | 10,000 – 20,000 | 22.50 |
| 150,000 – 200,000 | 9.40 | 20,000 – 30,000 | 21.20 |
| 200,000 – 500,000 | 31.50 | 30,000 – 40,000 | 15.50 |
| 500,000 – 1,000,000 | 17.40 | 40,000 – 50,000 | 10.80 |
| 1,000,000 + | 10.90 | 50,000 – 60,000 | 7.00 |
| | | 60,000 – 75,000 | 6.40 |
| | | 75,000 – 100,000 | 5.00 |
| | | 100,000 + | 2.50 |

About 8 g. of copper stearate reacted product was added to 92 g. of solution of 60 parts heptane and 40 parts xylene and attrited in a Waring Blender for 25 minutes while allowing the temperature to rise to 40° C. An apparent viscosity of 7800 cps., measured at 10 rpm in a Brookfield Viscometer Model HAT, was obtained at room temperature without any syneresis characteristics. Similarly, a smooth stable gel prepared from the cobalt stearate reacted product gave a viscosity of 8,000 cps.

MOLECULAR WEIGHT OF MICROCRYSTALLINE POLYPROPYLENE COMPARED TO THE PRECURSOR RESIN

The number average, weigh molecular weights and

DIFFERENTIAL SCANNING CALORIMETRY STUDIES OF MICROCRYSTALLINE POLYPROPYLENE AND ITS PRECURSOR RESIN

A Perkins-Elmer DSC-1B differential scanning calorimeter was employed to evaluate the melt behavior of microcrystalline polypropylenes prepared as in Example 12 as well as their precursor polypropylene resin.

In this procedure, a 5 mg. sample is heated in a nitrogen atmosphere at a rate of 10°C. per minute from room temperature to about 187°C. This constituted the first melt. The melt is then cooled at 10°C. This represented the crystallization cycle. The cooled sample is reheated under the same conditions as the first melt. This is designated the second melt.

The data for the differential calorimetric scans of the above materials are set forth below:

| Material | Melt | Temperature, °C. | | | | |
|---|---|---|---|---|---|---|
| | | Start | Peak* | Return | Crystallization peak | Area sq. in/ mq. |
| Polypropylene Precursor | 1st | 123 | 161 | 107 | 115 | 0.16 |
| | 2nd | 105 | 161 | 169 | 114 | 0.32 |
| Microcrystalline Polypropylene[1] | 1st | 123 | 145,156,159 | 162 | 110 | 0.20 |
| | 2nd | 113 | 151,159 | 163 | 110 | 0.36 |
| Microcrystalline Polypropylene[2] | 1st | 124 | 147,157,160 | 162 | 110 | 0.20 |
| | 2nd | 113 | 151,159 | 162 | 110 | 0.37 |
| Microcrystalline Polypropylene[3] | 1st | 129 | 147,150,157,160 | 162 | 111 | 0.19 |
| | 2nd | 113 | 151,159 | 163 | 110 | 0.37 |

[1] - Cobalt salt catalyzed - Fine fraction
[2] - Cobalt salt catalyzed - Coarse fraction
[3] - Copper salt catalyzed
* - Major peaks underlined It can be seen from the above table that the microcrystalline polypropylene has different thermal behavior than its polypropylene precursor. The first, and more perceptibly the second melt, for the microcrystalline polyolefins shows a characteristic double melt endotherm while the polypropylene precursor shows only the single endotherm in both melts.

To further demonstrate this difference in thermal behavior between the precursor resin and the oxidized resin, four grams each of the polypropylene precursor and microcrystalline polypropylene[2] (as depicted in the above table) were slurried with one gram of household paraffin wax dissolved in 25 mls. of n-heptane. The mixtures were agitated for 30 minutes at 60°C. and filtered hot. The residue is dried for at least 12 to 18 hours at 60°C. The precursor-wax mixture contained 3.08 percent wax while the microcrystalline polypropylene-wax mixture contained 6.04 percent wax.

The heating condition for the calorimetric scans were the same as described above except that the sample container is covered through the melting cycles.

The data for the differential calorimetric scans are set forth below:

Microcrystalline polyolefin-wax mixtures are useful in inhibiting attack on the polyolefin resin by ozone.

Microcrystalline polyolefine, unlike their polymer precursors, form "eutectic mixtures" with paraffin wax. This "co-crystallizing" behavior may be useful to inhibit wax migration in polymer melts. Such migration results in loss of moisture barrier properties.

CRYSTALLINITY OF MICROCRYSTALLINE POLYPROPYLENE COMPARED TO THE PRECURSOR RESIN

The degree of crystallinity of the polymers herein were measured by X-ray diffraction using techniques developed by Farrow, G. et al, British Jour. of Applied Phy., Vol. 11, 353 (1960) and Farrow, G., Polymer, Vol. 2, 409 (1961). This method tends to give lower crystallinity values than by linear extrapolation between the densities of totally crystalline polymer (0.936 g./cc.) and totally amorphous polymer (0.855 g./cc.) since small size crystallites appear in the diffraction method as amorphous materials.

The crystallinity data for these materials are given below:

| Material | Melt | Start | Peak* | Temperature °C. Return | ΔM Cal/gm | Crystallization ΔH Cal./gm. |
|---|---|---|---|---|---|---|
| Polypropylene | 1st | 123 | 161 | 169 | 16 | 19 |
|  | 2nd | 127 | 161 | 169 | 17 | 20 |
| Polypropylene-Wax | 1st | 107 | 160 | 169 | 16 | 19 |
|  | 2nd | 121 | 159,164 | 169 | 17 | 18 |
| Microcrystalline Polypropylene | 1st | 133 | 149,155 | 161 | 19 | 20 |
|  | 2nd | 126 | 148,157 | 161 | 20 | 20 |
| Microcrystalline Polypropylene-Wax | 1st | 113 | 144,154 | 157 | 17 | 17 |
|  | 2nd | 105 | 144,155 | 159 | 18 | — |

* - Major peaks underlined

| Material | Treatment | X-Ray Crystallinity,% |
|---|---|---|
| Isotactic Polypropylene Precursor | None | 47.8 |
| Microcrystalline Polypropylene | Copper Catalyzed - Oxidation | 73.6 |
| Microcrystalline Polypropylene | Cobalt Catalyzed - Oxidation | 75.2 |

Under identical conditions of preparation of the wax mixtures, the microcrystalline polymer absorbed twice as much wax as the precursor resin. During the second melt, the microcrystalline polymer appears to undergo a "phase change" with paraffin wax with a shift in the characteristic two melt endotherm from 148°C. and 157°C. to 144°C. and 155°C. The addition of wax to the polypropylene precursor had no effect on the melting behavior.

Microcrystalline polypropylene consists of macromolecules which can exist in the extended and/or folded chain state. The presence of the characteristic two melt endotherm in these low molecular microcrystalline polymers is attributed to narrow crystallite size distribution.

The high degree of crystallinity of the microcrystalline polypropylene compared to the conventional high molecular weight stereoregular polypropylene precursor is quite evident from these X-ray diffraction data.

PRODUCT UTILITY OF MICROCRYSTALLINE POLYPROPYLENE

EXAMPLE 13

50.0 g. of 2.5 percent gel dispersion of cobalt stearate reacted polypropylene powder in 70 parts heptane and 30 parts xylene solvent mixture was passed through a filter paper and the filter paper air dried. The filter paper was heat pressed on a Hobel & Wood hotplate for one minute at 120°-130°C. and then boiled with a direct cotton dye solution, washed several times with water and air dried. Microscopic examination at 1,000X magnification showed a porous membraneous structure formed by the coalescence of the surfaces and still retaining its discrete particulate form.

A similar sample when heated for one minute at 150°–155°C. formed a continuous water impenetrable coating devoid of discrete microcrystal colloidal polypropylene particles.

EXAMPLE 14

A type T gravure ink formulation containing a chlorinated rubber base was prepared.

| | Percent |
|---|---|
| Manolite Fast Yellow GS | 7.5 |
| Alumina Hydrate | 9.4 |
| Chlorinated Rubber, 12 cps | 7.6 |
| Microcrystalline Polypropylene (less than 1 micron particles) | 5.0 |
| Chloroform | 20.0 |
| Toluene | 46.5 |
| Modified Phenol-Formaldehyde with esterified resin. m.p. = 140° powder | 4.0 |

The microcrystalline polypropylene powder was dispersed in the chloroform-toluene solvent mixture and agitated at high speed in all added and mixed in a ball mill for 10 hours at 30°–35°C. This rotagravure ink has fast drying properties with good acid and alkaline resistance. The micocrystalline polypropylene colloidal gel imparts good flow control and printing uniformity due to its colloidal particle size and narrow particle size distribution. It improved the anti-scuff and mar-resistance of the printed sheet surface.

EXAMPLE 15

1.25 g. of microcrystalline polypropylene in colloidal dry powder form was dispersed in 50 grams of a mixture of 30 parts xylene and 70 parts of n-heptane containing 0.10 g. of Duponol. A colloidal gel dispersion was formed after mixing in a Waring Blender for 30 minutes at 60°C.

25.0 g. of 1.5 denier, ¼ inch cut rayon staple containing the microcrystalline polypropylene dispersion was processed according to TAPPI T205m-58. Handsheets were prepared according to this procedure and heat treated at 130°–140°C. and these were conditioned at 50°F. and 70 percent relative humidity for 40 hours. The tensiles and tear physicals were determined according to TAPPI T220m-60. The microcrystalline polypropylene colloidal gel acts as a "spot weld" binder and imparts improved wet and dry physicals on nonwoven rayon staple structures. (See Table I following).

TAPPI T205m-58 is a standard procedure used in the paper and pulp art for preparing sheets from pulps. TAPPI T205m-60 is a standard procedure used in the paper and pulp art for evaluating sheets prepared from pulps.

TABLE I

| TAPPI ream wt. (123×24–500) | Microcrystalline Polypropylene Powder % | Breaking Length, meters | Tear Factor | Breaking Length, meter | Tear Factor | Wet Strength % (a) |
|---|---|---|---|---|---|---|
| | | (Dry) | | (Wet) | | |
| 40.2 | 0 | Not Measurable (b) | | Not Measurable (b) | | — |
| 41.5 | 2.5 | 2720 | 310 | 950 | 102 | 33 |
| 42.3 | 5.0 | 4100 | 506 | 1760 | 210 | 41.5 |

(a) Based on Dry strength.
(b) Too weak to be measured.

While all of the above examples were carried out using crystalline polypropylene resin as the precursor material, similar results are also obtained using the other crystalline polyolefins described herein whereby novel and useful microcrystalline polyolefins are obtained.

Various changes and modifications may be made in practicing the invention without departing from the spirit and scope thereof and, therefore, the invention is not to be limited except as defined in the appended claims.

We claim:

1. As an article of manufacture, thermal-oxidatively degraded, substantially atactic-free, mechanically disintegrated microcrystalline polyproplene resin in the form of finely-divided, discrete microcrystalline particles at least about 5 percent by weight having a particle size not exceeding one micron and in contrast to its precursor polyolefin resin having a molecular weight of about 1/10 that of the precursor resin and exhibiting a sharper X-ray diffraction pattern and two separate melting point ranges as demonstrated in the differential scanning calorimetry procedure as described herein and being further characterized in forming a stable dispersion in a liquid medium having a minimal swelling action on said resin particles which may solvate some of the surface of the particles without destroying the interior crystallinity of the particles.

2. An article of manufacture as defined in claim 1 wherein the microcrystalline polypropylene resin particles are mixed with a hydrocarbon wax to form an eutectic mixture and the microcrystalline polypropylene resin particles-wax eutectic mixture contains about twice the amount of wax as compared to a percursor resin-wax mixture.

3. An article of manufacture as defined in claim 1 wherein at least 95 percent by weight of the finely-divided, discrete microcrystalline particles have a particle size not exceeding one micron and at least about 10 percent by weight of the finely-divided, discrete particles have a particle size not exceeding 0.1 micron.

4. A stable dispersion comprising finely-divided, discrete microcrystalline polypropylene resin particles at least about 5 percent by weight having a particle size not exceeding one micron, of thermal-oxidatively degraded, substantially atactic-free, mechanically disintegrated microcrystalline polypropylene resin and in contrast to its precursor polyolefin resin having a molecular weight of about 1/10 that of the precursor resin and exhibiting a sharper X-ray diffraction pattern and two separate melting point ranges as demonstrated in the differential scanning calorimetry procedure as described herein, dispersed in a liquid medium having a minimal swelling action on said resin particles which may solvate some of the surface of the particles without destroying the interior crystallinity of the particles.

5. A stable dispersion as defined in claim 4 wherein the liquid medium is an aqueous liquid.

6. A stable dispersion as defined in claim 4 wherein the liquid medium is organic liquid.

* * * * *

UNITED STATES PATENT OFFICE
CERTIFICATE OF CORRECTION

PATENT NO. : 3,862,069
DATED : January 21, 1975
INVENTOR(S) : MAMERTO M. CRUZ, JR., ORLANDO A. BATTISTA and NICHOLAS Z. ERDI It is certified that error appears in the above-identified patent and that said Letters Patent are hereby corrected as shown below:

Column 7, line 26, "products," should read --product,--.

Column 7, line 26, "when product, to attrition" should read --when subjected to attrition--.

Column 7, line 32, "obtainded" should read --obtained--.

Column 8, line 11 "59%" should read --89%--.

Column 9, line 52 "weigh molecular" should read --weight average molecular--.

Column 10, line 46 "The melt is then cooled at 10°C." should read --The melt is then cooled at 10°C per minute to below 50°C.--

Column 10, line 56 "107" should read --167--.

Column 12, line 3 "polyolefine" should read --polyolefins--.

Claim 6, Column 16, line 3, "is organic liquid" should read --is an organic liquid--.

Signed and Sealed this first Day of June 1976

[SEAL]

Attest:

RUTH C. MASON
Attesting Officer

C. MARSHALL DANN
Commissioner of Patents and Trademarks